Patented Apr. 12, 1938

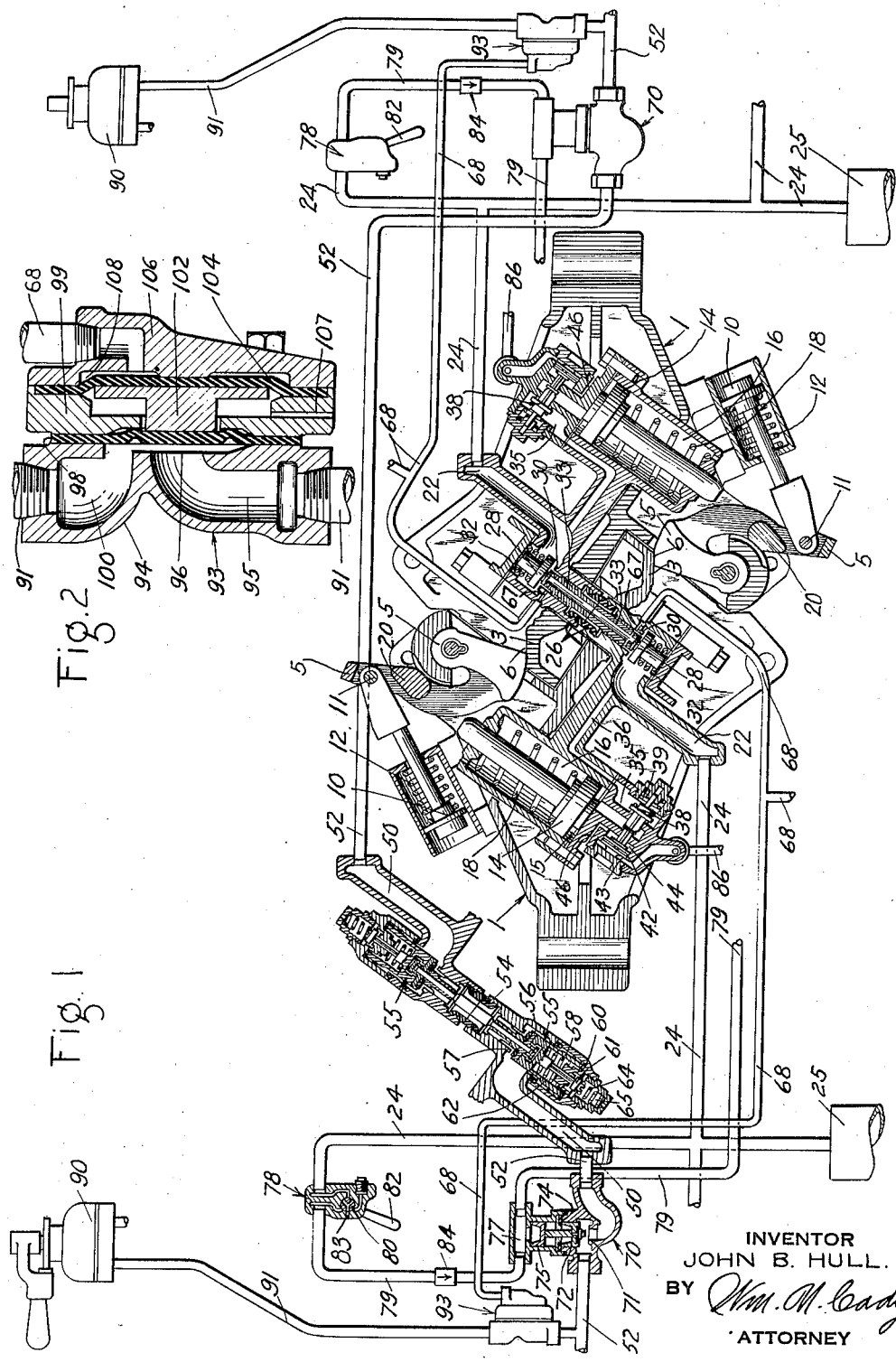

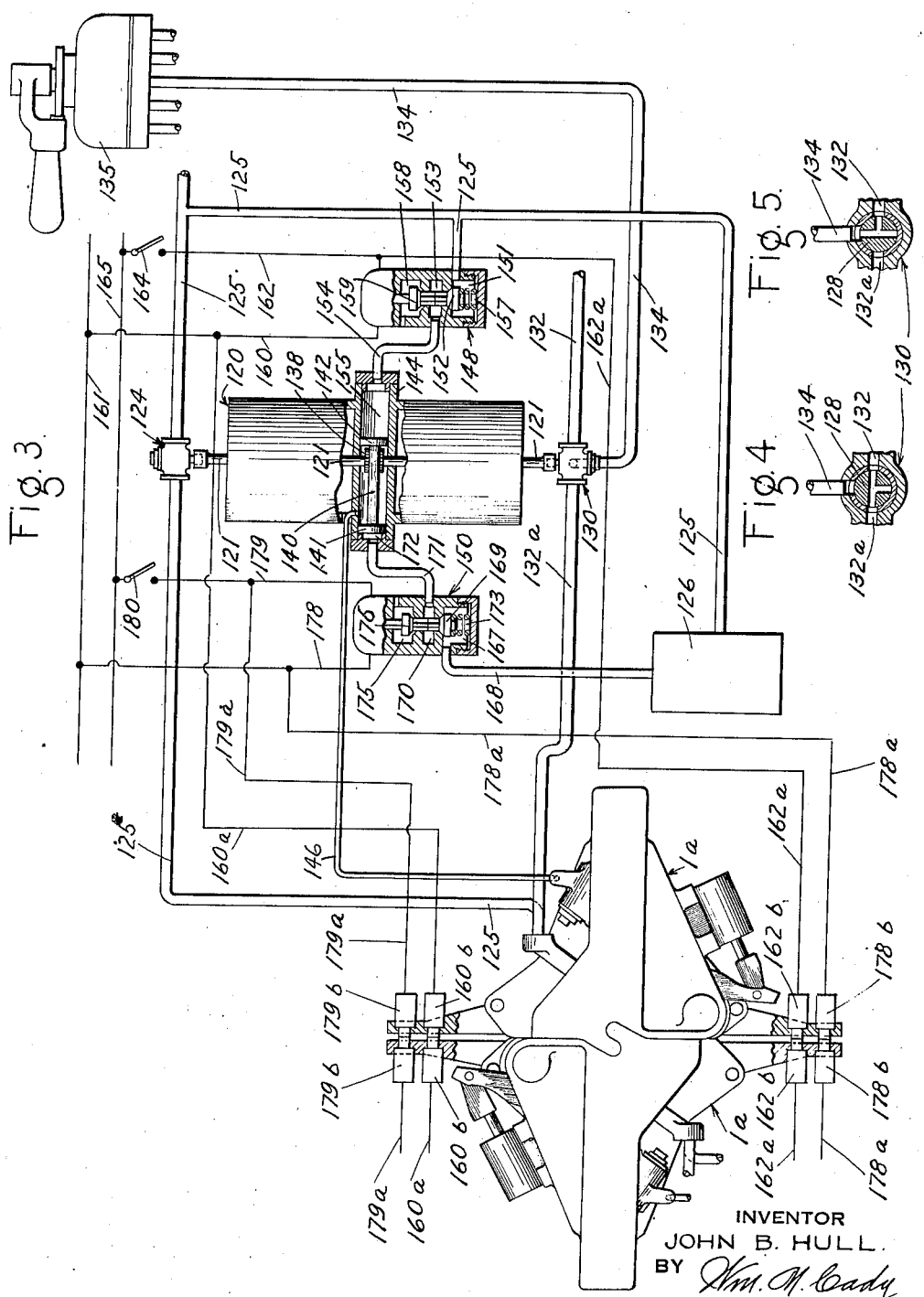

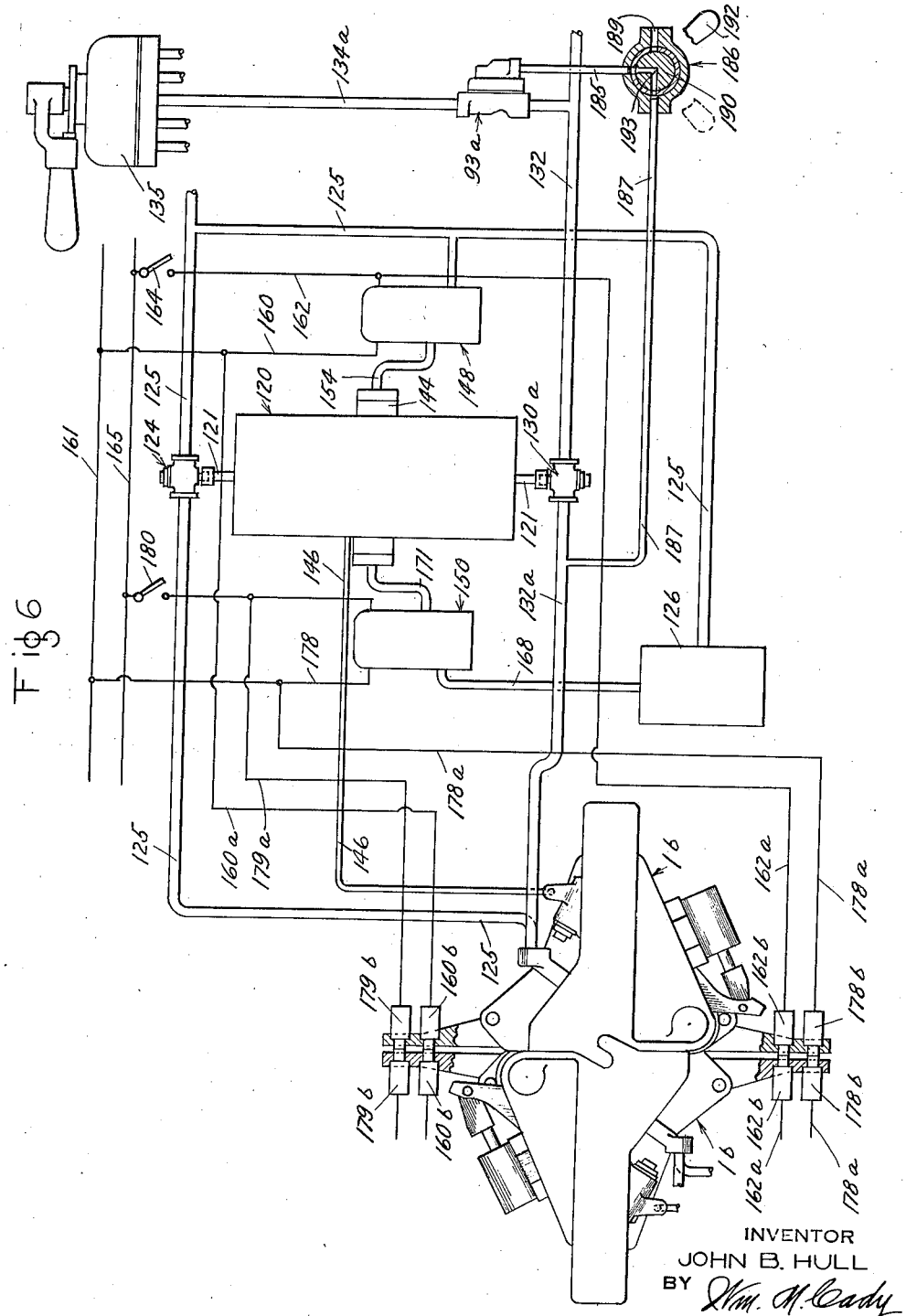

2,113,652

UNITED STATES PATENT OFFICE 2,113,652

FLUID PRESSURE BRAKE

John B. Hull, Berkeley, Calif., assignor to The Westinghouse Air Brake Company, Wilmerding, Pa., a corporation of Pennsylvania Application August 14, 1937, Serial No. 159,036

20 Claims. (Cl. 303—14)

This invention relates to a vehicle fluid pressure brake equipment, and more particularly to a brake equipment for a car equipped with automatic couplers for coupling the car to other similar cars, and for establishing communication between the brake pipe on each of the cars, as well as to establish electric train line circuits between the cars.

The car equipment of certain railway systems, such as some traction railway systems, includes cars which are provided with control equipment, such as a motor controller and a brake valve, to enable the car to be operated separately, or to control a train consisting of two or more similar cars.

When several cars of this type are connected together to form a train, the brakes on all of the cars of the train are controlled by means of the brake valve at the forward end of the leading car in the train.

The branch pipe leading from the brake pipe to the brake valve on each of the cars is of considerable length, and correspondingly of considerable volume. If the branch pipes on all of the cars of the train remain connected to the brake pipe, the volume of the brake pipe will be greatly increased, and on a reduction in brake pipe pressure to effect an application of the brakes on the train, fluid will flow from the branch pipes to the brake pipe, and will interfere with the transmission throughout the train of a reduction in brake pipe pressure, thereby increasing the time required to effect an application of the brakes.

The brakes on a train of this kind are controlled by the brake valve on the car at the forward end of the train, and the brake valves on the other cars of the train need not be connected with the brake pipe. Accordingly it has been proposed to provide valves in the branch pipes at points therein adjacent the brake pipe, to cut off communication through the branch pipes on all of the cars of the train, except on the forward end of the car at the head of the train to thereby eliminate the difficulty experienced when the branch pipes remain connected to the brake pipe.

It has heretofore been proposed to employ a manually controlled valve to control communication between the brake pipe and the branch pipe. However, there is a possibility that when a car is uncoupled from a train, that the valve controlling communication between the brake pipe and the branch pipe will not be opened, with the result that the brake valve on this car will not be connected to the brake pipe, and will, therefore, be unable to control the brakes on the car. If the car is then operated in this condition, an accident may result.

It is an object of this invention to provide equipment adapted to be employed on cars of the type described, and interconnected with the couplers so that when the coupler at the end of the car is coupled to another car the equipment will operate automatically to cut off communication between the brake pipe and the branch pipe at this end of the car, and will also operate automatically when the coupler at this end of the car is uncoupled from another car to establish communication between the brake pipe and the branch pipe so that the brake valve on the car will be able to control the brakes on the car.

A further object of the invention is to provide means of the type described which is arranged so that it can be employed with couplers of the type now in use without alteration of these couplers.

Another object of the invention is to provide for a vehicle having a communication charged with fluid under pressure only when the vehicle is connected with another, means responsive to the pressure of the fluid in said communication for controlling communication between the branch pipe and the brake pipe on the vehicle.

Other objects of the invention and features of novelty will be apparent from the following description taken in connection with the accompanying drawings, in which Fig. 1 is a diagrammatic view, largely in section, of a portion of the brake equipment on two cars equipped with the system provided by this invention, Fig. 2 is an enlarged sectional view of a valve employed in the system shown in Fig. 1, Fig. 3 is a fragmentary diagrammatic view, partly in section, of the brake equipment of a car equipped with a modified form of the system provided by this invention, Figs. 4 and 5 are sectional views of one of the valves employed in the system shown in Fig. 3, and Fig. 6 is a diagrammatic view of a brake equipment embodying a modified form of my invention.

Referring to Fig. 1 of the drawings, there is shown therein a portion of the equipment at the coupled ends of cars provided with apparatus embodying this invention. These cars arranged for double end control, that is, they are provided at each end with control equipment including a brake valve and associated apparatus to enable the car to be operated from either end.

These cars also have at each end a coupler adapted to be coupled to a counterpart coupler to connect the cars together, and to establish communication between the brake pipe and a supply pipe on the coupled cars, and to also establish electric circuits between the cars. The couplers on the cars are indicated generally by the reference numeral 1.

The couplers 1 shown in Fig. 1 of the drawings are of the type shown and claimed in U. S. Patent No. 1,571,222 to H. F. Woernley, but it is to be understood that this invention is not limited to the use of couplers of this type, and that it is contemplated that other types of couplers may be employed.

The coupler 1 forms no part of the present invention, and only such parts of the construction and operation of the couplers is included herein as is essential to the understanding of this invention.

The coupler 1 comprises a body having a hook-shaped projection 3 thereon inclined at an angle to the line of draft, and adapted to engage and interlock with a corresponding surface on the projection 3 of a counterpart coupler by relative lateral movement when the couplers come together in the act of coupling.

Each of the couplers 1 is provided with a pivoted locking lever 5 adapted to bear against a locking surface 6 on the projection 3 of a counterpart coupler to hold the couplers securely clamped together in the coupled position.

The locking levers 5 have associated therewith means for maintaining the levers in the locking position. As shown this means comprises a plunger having a head 10 mounted in a bore in the body of the coupler 1, and having an end pivotally secured to the locking lever 5 by means of a pin 11. A spring 12 extends between the head of the plunger 10 and an end wall of the bore in which the plunger is mounted, and yieldingly moves the plunger to move the locking lever 5 in a direction to cause the lever to press against the locking surface 6 on the counterpart coupler.

For the purpose of releasing the couplers, fluid pressure operated means are provided, and, as shown, comprises a piston 14 which is mounted in a bore in the body of the coupler, and having at one face thereof a chamber 15 adapted to be supplied with fluid under pressure in a manner hereafter to be described, while the piston 14 has at the other face thereof a chamber 16 constantly open to the atmosphere.

A spring 18 is mounted in the chamber 16, and extends between the piston 14 and an end wall of the bore in which the piston is mounted. The piston 14 has a stem formed integral therewith which extends through the end wall of the chamber 16, and is adapted on movement of the piston against the spring 18 to engage a lug 20 on the locking lever 5 to move the locking lever and the plunger 10 against the spring 12, and thereby release the coupler.

The body of each of the couplers has a supply passage 22 formed therein and having connected thereto a branch of a pipe 24 leading from a source of fluid under pressure, such as a reservoir 25 on the car on which the coupler is mounted. The body of each of the couplers also has a bore therein opening on the face of the coupler, and surrounded by a resilient annular sealing gasket or bushing 26, which projects from the face of the coupler 1, and is adapted to be engaged by a similar gasket or bushing carried by the connected coupler to provide a communication between the supply passages 22 in the couplers, and to prevent leakage of fluid under pressure from these passages.

The supply passage 22 in each of the couplers has a valve 28 mounted therein and adapted to engage a seat rib 30 surrounding the passage. This valve is yieldingly pressed to the seated position by a coil spring 32, while the valve has a hollow stem 33 which is mounted in a portion of the supply passage 22, and which, when the valve 28 is in the seated position, projects from the face of the coupler. When the coupler is connected to another coupler, the stem 33 of the valve 28 engages the stem of the valve on the connected coupler, with the result that both of the valves are held in their open positions against the springs 32 to thereby establish communication through the supply passages 22 in each of the couplers.

Each of the couplers also has formed therein a valve chamber 35, which is connected by way of a passage 36 with the supply passage 22 at a point therein on the side of the seat rib 30 adjacent the reservoir 25 so that the chamber 35 is constantly supplied with fluid under pressure from the reservoir. A valve 38 is mounted in the chamber 35, and is yieldingly pressed by a spring 39 into engagement with a seat rib surrounding a passage open to the chamber 15 at the face of the piston 14.

Each of the couplers also has a bore therein in which is mounted an operating piston 42 having at one side an operating chamber 43, and having at the other side a chamber 44 open to the atmosphere through a passage 46. The operating piston 42 has a fluted stem which is mounted in a bore open to the chamber 15, while the end of this stem engages the end of the stem of the valve 38. The piston 42 also carries a sealing gasket having an annular seat rib thereon adapted to engage the wall of the chamber 44 at certain times to prevent leakage of fluid from the chamber 15 to the atmospheric passage 46.

Each of the couplers has associated therewith means operated when the coupler is coupled to another to establish communication between the brake pipes on the coupled cars, and also operative, when the coupler is not coupled to another, to close the brake pipe passage in the coupler, and thereby prevent leakage of fluid from the brake pipe. The brake pipe passages in the couplers as actually constructed are arranged in the same vertical plane as the reservoir or supply passages 22, but to more clearly disclose the construction of this portion of the couplers, this portion of the couplers is shown in the drawings at one side of the other parts of the couplers.

The body of each of the couplers has a brake pipe passage 50 therein to which is connected an end of the brake pipe 52 on the car on which the coupler is carried. The end of the passage 50 at the face of the coupler is surrounded by an annular resilient bushing 54 which projects from the face of the coupler body, and which, when the coupler is coupled to another, engages a corresponding gasket or bushing on the connected coupler to prevent leakage of fluid from the passage through the bushing.

The brake pipe passage 50 has associated therewith valve means indicated generally by the reference numeral 55, and comprising a valve 56 adapted to engage a seat rib 57 surrounding the passage 50. The valve 56 has a cylindrical guide portion mounted in a bore in the coupler body, while a coil spring 58 extends between the coupler body and the valve 56 and yieldingly presses the valve against the seat rib 57. The end of the guide portion of the valve 56 has a seat rib thereon adapted to engage a sealing gasket 60 on movement of the valve against the spring 58. A valve 61 is provided and engages a seat surrounding a passage open to the chamber 62 at the spring side of the valve 56. The valve 61 has a fluted stem which extends into the chamber 62, and is adapted to be engaged by the valve 56 to move the valve 61 away from its seat against a spring 64, which is mounted in a chamber 65 which is open to the atmosphere.

The valve 56 has associated therewith a stem which projects from the face of the coupler, and which, when the coupler is coupled to another, engages the stem of the valve on the connected coupler so that both of the valves are held away from their seats.

Each of the couplers 1 has an electric portion, not shown, incorporating a movable contact carrying slide, not shown, which, when two couplers are coupled together, is projected outwardly by a spring so that the contacts carried thereby engage corresponding contacts carried by the slide on the other coupler to thereby establish electric circuits between the cars through these contacts.

When the couplers are uncoupled, the contact carrying slides are moved against these springs by pistons, not shown, which are operated on the supply of fluid under pressure to the chambers at the faces thereof, while the contact carrying slides are held in the retracted positions by means of triggers, not shown.

Each of the couplers includes a trigger release piston, not shown, which is operated on the supply of fluid under pressure to a chamber at the face thereof to release the trigger, and permit the contact carrying slide of the coupler to be moved outwardly by the spring associated therewith.

The couplers incorporate means automatically operable, when a coupler is coupled to another, to supply fluid under pressure to the chamber at the face of the trigger release piston, while this means also operates, when the coupler is uncoupled from another coupler, to cut off the supply of fluid under pressure to the chamber at the face of the trigger release piston, and to release fluid under pressure therefrom.

As shown in the drawings, the coupler 1 has a passage 67 therein which communicates with the supply passage 22 at a point therein between the face of the coupler and the seat rib 30 surrounding this passage. This portion of the supply passage 22 is charged with fluid under pressure from the reservoir 25 when the coupler is coupled to another coupler. When the coupler is not coupled to another coupler, the valve 28 is seated, thereby cutting off the supply of fluid under pressure to this portion of the supply passage 22, while this portion of the passage 22 is open to the atmosphere at that time.

A pipe 68 is connected to the passage 67 and leads to the chamber at the face of the trigger release piston, not shown, while a branch of this pipe supplies fluid under pressure to a valve device for controlling communication between the brake pipe and a branch pipe, as will be hereinafter more fully explained.

The brake pipe 52 on each of the cars has a brake pipe cut-off valve device 70 interposed therein, and, as shown, this valve device comprises a body having a passage therethrough, and having a seat rib 71 surrounding this passage. The body has a bore therein in which is mounted a valve 72 carrying a sealing gasket adapted to engage the seat rib 71. The valve 72 also has a seat rib formed thereon and adapted to engage a sealing gasket 74 carried by the body of the valve device.

The valve 72 has connected thereto a piston 75 which is subject on one side to the pressure of the fluid in a chamber 77, and on an increase in the pressure of the fluid in this chamber, the piston 75 moves the valve 72 into engagement with the seat rib 71 to cut off communication between the portion of the brake pipe 52 on the car, and the portion of the brake pipe 52 which is connected to the passage 50 in the coupler 1.

Each of the couplers has associated therewith an uncoupling valve device 78 for controlling the supply and release of fluid under pressure to and from the brake pipe cut-off valve device, the chamber at the face of the slide retracting piston, not shown, in the electric portion of the coupler, and to the chamber 43 at the face of the operating piston 42 in the coupler.

As shown in the drawings, the uncoupling valve device 78 comprises a body having a passage therein to which is connected a branch of the pipe 24 leading from the reservoir 25, while the body of this valve device has another passage therein to which is connected a pipe 79. A plug valve 80 is mounted in a bore in the body of the valve device 78, and is turned by a handle 82.

The plug valve 80 has ports therein adapted in one position of the plug valve to connect the pipe 24 to the pipe 79, and in another position of the plug valve to connect the pipe 79 to an atmospheric port 83, while in this position of the plug valve communication between the pipe 24 and the pipe 79 is cut off.

The pipe 79 has a check valve 84 interposed therein and operative to permit fluid to flow through the pipe 79 from the uncoupling valve device 78, and to prevent back flow of fluid through the pipe 79 to the uncoupling valve device 78.

The pipe 79 leads from the valve device 78 to the chamber 77 of the brake pipe cut-off valve device 70, and therefrom to the chamber at the face of the slide retracting piston, not shown, in the electric portion of the coupler 1.

The bore in which the slide retracting piston of the coupler is mounted has a port in the wall thereof controlled by the piston, and arranged so that fluid under pressure may flow through this port from the chamber at the face of the slide retracting piston after a predetermined movement of this piston in a direction to move the contact carrying slide against the spring associated therewith. The port in the wall of this bore is connected by way of a pipe 86 with the chamber 43 at the face of the operating piston 42.

These couplers also incorporate a passage, not shown, through which fluid under pressure supplied to the chamber at the face of the slide retracting piston in one of the couplers may flow to the chamber at the face of the slide retracting piston in the connected coupler, and to the associated passages in the connected coupler, while the check valve 84 interposed in the pipe 79 leading from the uncoupling valve device 78 associated with the connected coupler prevents flow of fluid to this uncoupling valve device, and thence to the atmsophere.

The brake equipment on each of these cars includes a brake valve 90, which may be of any suitable well known construction, and which is connected with the brake pipe 52 by way of a branch pipe 91. The cars may be provided with the brake valves only at one end, or they may be provided with brake valves at each end. The cars shown in Fig. 1 of the drawings are presumed to be equipped with control equipment, including a brake valve, at each end of the car.

The branch pipe 91 has interposed therein at a point adjacent the brake pipe 52, a control valve device 93. The construction of the valve device 93 is shown in Fig. 2 of the drawings, and comprises a body 94 having a curved passage 95 therein and having threads in the wall surrounding one end of this passage, and in which is secured an end of the portion of the branch pipe 91 which is connected to the brake pipe 52. The other end of the passage 95 is surrounded by a flat seating face, indicated at 96, and adapted to be engaged by a face of a flexible diaphragm 98, which is clamped between the body 94 and a member 99. The area at the face of the diaphragm 98 outwardly of the seating face 96 is open to a passage 100, to which is secured the portion of the branch pipe 91 which is connected to the brake valve 90.

The member 99 has a central opening therein in which is mounted a plunger 102 having a stem engaging a face of the diaphragm 98, and having a head engaged by a diaphragm 104 which is clamped between the member 99 and a cover 106. The chamber between the diaphragms 98 and 104 is open to the atmosphere through a port 107.

The chamber 108 at the other face of the diaphragm 104 has connected thereto a branch of the pipe 63 leading to the chamber at the face of the trigger release piston, not shown, in the coupler 1, so that the chamber 108 is charged with fluid under pressure when the chamber at the face of the trigger release piston in the coupler which is charged with fluid under pressure, and similarly, when the chamber at the face of the trigger release piston is connected to the atmosphere, the chamber 108 is connected to atmosphere.

The control valve device 93 is constructed so that the diaphragm 104 has a substantially larger area subject to fluid under pressure in the chamber 108 than the area of the diaphragm 98 which is subject to the fluid in the branch pipe 91. Accordingly, on the supply of fluid under pressure to the chamber 108, the force exerted on the diaphragm 104 is great enough to overcome the opposing force of the fluid in the branch pipe operating on the diaphragm 98, and to move the diaphragm into engagement with the seating face 96.

In operation, the handles of the brake valves 90 on all of the cars in the train, except the brake valves at the forward end of the leading car of the train, are turned to their handle off positions, in which the brake valves neither supply fluid under pressure to the branch pipes 91 leading to the brake pipe 52, nor release fluid under pressure therefrom.

At this time the couplers on all of the cars, except the coupler at the forward end of the leading car, and the coupler at the rear of the last car, are coupled to other couplers with the result that the valve 28 in the supply passage 22 in each of these coupled couplers is held in the open position, as shown in Fig. 1 of the drawings, to establish communication between the supply pipe on the cars of the train, and to effect the supply of fluid under pressure to the pipes 63 leading to the chambers at the faces of the trigger release pistons in these couplers.

As the chamber at the face of the trigger release piston in each of the couplers is charged with fluid under pressure, this piston operates to maintain the trigger in its release position to thereby permit the spring associated with the contact carrying slide in the electric portion of the coupler to project the contact carrying slide outwardly, and thereafter maintain it in its outer position so that the contacts carried thereby engage the corresponding contacts carried by the contact carrying slide of the coupled coupler.

Fluid under pressure supplied to the pipe 68 flows to the chamber 108 at the face of the diaphragm 104, and on an increase in the pressure of the fluid in this chamber, force is exerted through the diaphragm 104 and the plunger 102 to press the diaphragm 98 against the seating face 96 surrounding the end of the passage 95, to thereby cut off communication through the branch pipe 91 at a point therein adjacent the brake pipe 52.

It will be seen, therefore, that as soon as the couplers are coupled together, and fluid under pressure is supplied to the chambers at the faces of the trigger release pistons incorporated in the electric portions of the couplers, which takes place automaticaly as a result of coupling the couplers together, fluid is supplied to the control valve devices 93 interposed in the branch pipes leading to the brake valves on the ends of the cars on which the couplers are mounted, and that these control valve devices cut off communication through the branch pipes on these ends of the cars.

At this time the coupler at the forward end of the leading car is not coupled to another coupler, and, accordingly, the valve 28 of this coupler is held in the seated position with the result that the portion of the supply passage 22 between the seat rib 30 and the face of the coupler is open to the atmosphere. Accordingly, no fluid under pressure will be supplied to the trigger release piston in the coupler at the forward end of the leading car, and, similarly, no fluid under pressure will be supplied to the chamber 108 of the control valve device 93 interposed in the branch pipe 91 leading to the brake valve 90 at this end of the leading car.

As the result, therefore, the brake valve 90 at the forward end of the leading car will be connected to the brake pipe in the usual manner, and can be operated to supply fluid under pressure to, and to release fluid under pressure from the brake pipe through the branch pipe.

Similarly, the coupler at the rear of the trailing car is not connected to another coupler, and the control valve device 93 in the branch pipe 91 at this end of the last or trailing car of the train will not be operated to cut off communication between the brake pipe and the branch pipe.

If at this time it is desired to effect an application of the brakes on the train by operation of the brake valve at the forward end of the leading car, the handle of this brake valve is turned in the usual manner to an application position in which fluid under pressure is released from the brake pipe 52.

On this reduction in the pressure of the fluid in the brake pipe, there is a reduction in brake pipe pressure throughout the train. At this time, however, as the control valve devices 93 cut off communication between the branch pipes 91 and the brake pipe at points adjacent the brake pipe, there will be little or no flow of fluid from these branch pipes to the brake pipe, and, accordingly, the propagation of brake pipe reduction throughout the train will not be delayed by flow of fluid to the brake pipe from the branch pipes.

As a result, therefore, the reduction in brake pipe pressure will be effective throughout the length of the train very quickly, and the valve devices on the various cars of the train, which are operated in response to a reduction in brake pipe pressure, will operate promptly to produce an application of the brake.

On this reduction in brake pipe pressure, fluid under pressure will flow to the brake pipe from the branch pipe 91 at the rear of the last or trailing car. However, the amount of fluid under pressure supplied to the brake pipe from this branch pipe alone is insufficient to materially affect the pressure of the fluid in the brake pipe, while the fluid flowing to the brake pipe from this branch pipe will not create any objectionable turbulence in the flow of fluid in the brake pipe throughout the train.

The system provided by this invention is also arranged so that when two cars are uncoupled, the control valve devices 93 interposed in the branch pipes will be automatically operated to establish communication through these branch pipes, and thereby restore control of the brakes on the car to the brake valve at the end of the car which is no longer coupled to another car.

In order to release a coupler, the handle 82 of the uncoupling valve device 78 associated with either of the couplers which it is desired to uncouple is turned from the normal position to the uncoupling position, thereby turning the plug valve 80 to a position in which the port therein establishes communication between the pipe 24, leading from the reservoir 25, and the pipe 79, with the result that fluid under pressure flows to the pipe 79, and through the check valve 84 to the chamber 77 at the face of the piston 75 of the brake pipe cut-off valve device 70. On an increase in the pressure of the fluid in the chamber 77, the piston 75 moves the valve 72 into engagement with the seat rib 71, thereby cutting off communication between the portion of the brake pipe 52 on the car, and the portion of the brake pipe 52 which is connected to the coupler at the end of the car which is being uncoupled.

On the supply of fluid under pressure to the chamber 77, fluid flows therefrom by way of the pipe 79 to the chamber at the face of the slide retracting piston, not shown, in the electric portion of the coupler on the car on which the uncoupling valve device is mounted, while fluid also flows from this chamber by way of a passage, not shown, incorporated in the coupler to the chamber at the face of the slide retracting piston in the electric portion of the connected coupler.

On an increase in the pressure of the fluid in the chambers at the faces of the slide retracting pistons in the electric portions of the couplers, these pistons operate to move the contact carrying slides against the springs associated therewith. When the slide retracting pistons have been moved to predetermined points in their range of movement, they uncover ports in the walls of the bores in which they are mounted, which ports are connected by way of the pipes 86 to the chambers 43 at the faces of the operating pistons 42 in each of the couplers. On an increase in the pressure of the fluid in the chambers 43, the pistons 42 move the valves 38 to their open positions, and open relatively large communications through which fluid under pressure is supplied from the reservoirs 25 to the chambers 15 at the faces of the pistons 14, and these pistons are rapidly moved against the springs 18 associated therewith, with the result that the stems of these pistons engage the lugs 20, and move the locking levers 5 out of engagement with the locking surfaces 6 to thereby release the couplers and permit them to be separated.

As soon as the couplers are moved away from each other, the stems 33 of the valves 28 no longer engage, and the valves 28 are moved to the seated position by the springs 32 associated therewith, and thereby cut off communication through the supply passages 22.

As soon as the couplers are separated, the resilient bushings or gaskets 26 are moved out of engagement with each other, and the ends of the supply passages 22 opening on the faces of the couplers are open to the atmosphere, and fluid under pressure is released from the chambers at the faces of the trigger release pistons, and also from the chambers 108 in the control valve devices 93 with the result that the diaphragms 98 of the valve devices 93 are no longer held against the seating faces 96. On the release of fluid under pressure from the chambers at the faces of the trigger release pistons, these pistons permit the triggers to be moved to their latching positions to prevent return movement of the contact carrying slides by the springs associated therewith.

It will be seen, therefore, that as soon as the couplers are parted, the control valve devices 93 no longer operate to cut off communication through the branch pipes 91, and the fluid under pressure present in the brake pipe 52 operating on the faces of the diaphragms 98 will move these diaphragms away from the seating faces 96 and permit fluid from the brake pipe to flow to the passages 100, and thence to the portions of the branch pipes 91 between the control valve devices 93 and the brake valves 90. As the brake valves 90 are connected to the brake pipe, it is possible, as soon as the end of a car is uncoupled from another, to release fluid under pressure from the brake pipe by operation of the brake valve at this end of the car, and thereby control the brakes on the vehicle or on any connected vehicle.

In addition, as soon as the couplers are separated, the valve means 55 associated with the brake pipe passages 50 in the couplers are operated to cut off communication between the passages in the coupler and the atmosphere.

During the uncoupling operation, the brake pipe cut-off valve device 70 on each car prevents flow of fluid to the portion of the brake pipe connected to the passage 59 in the coupler so that there will not be a reduction in brake pipe pressure occasioned by leakage of fluid from the brake pipe in the act of uncoupling.

As soon as the couplers have been separated, the handle 82 of the uncoupling valve device 78 is returned from the uncoupling position to the normal position, in which communication is cut off between the pipe 24 and the pipe 79, and in which the pipe 79 is connected to the atmosphere.

As soon as the couplers are separated, the chamber at the face of the slide retracting piston, not shown, in the electric portion of each of the couplers is connected to the atmosphere so that fluid under pressure present therein may escape to the atmosphere, while fluid under pressure present in the portion of the pipe 79 between the brake pipe cut-off valve device 70 and the chamber at the face of the slide retracting piston, as well as the fluid under pressure present in the chamber 77 of the brake cut-off valve device, may escape to the atmosphere through this passage in the coupler. On this reduction in the pressure of the fluid in the chamber 77, the valve 72 is moved upwardly away from the seat rib 71 and into engagement with the sealing gasket 74, so that the portion of the brake pipe 52 on the car is connected to the portion of the brake pipe 52 connected to the coupler, but before this connection is established, the valve means 55 of the coupler will be operated to its closed position to prevent the release of fluid under pressure from the brake pipe through the coupler.

In addition, upon the reduction in the pressure of the fluid in the chamber at the face of the slide retracting piston of the electric portion of a coupler, fluid is released from the pipe 86 leading to the chamber 43 at the face of the operating piston 42 in the coupler, and on a reduction in the pressure of the fluid in this chamber, the valve 38 is moved by the spring 39 to the seated position to cut off the supply of fluid under pressure to the chamber 15 at the face of the piston 14, while the piston 14 is returned by the spring 18 to the position in which it is shown in the drawings.

It will be seen that the system provided by this invention incorporates means automatically operable when a coupler on a car is coupled to another coupler to cut off communication between the brake pipe and the branch pipe at the end of the car on which the coupler is mounted. The brake valve at this end of the car is not employed to control the brakes at this time, and need not be connected to the brake pipe, and as the branch pipe is isolated from the brake pipe, fluid cannot flow from the branch pipe to the brake pipe to interfere with a reduction in brake pipe pressure.

It will be seen also that the system provided by this invention is arranged so that when the coupler at an end of a car is disconnected from another coupler, communication is established between the brake pipe and the branch pipe at the end of the car on which the coupler is mounted. The brake valve at this end of the car may be required to control the brakes on the car at this time since the car may not be connected to another car, and as the system provided by this invention automatically establishes communication between the branch pipe and the brake pipe as soon as the coupler is disconnected, the brake valve will be conditioned to control the brakes on the car without the necessity of special attention on the part of the operator.

It will be seen also that the system provided by this invention is arranged to take advantage of the operating conditions present in the couplers as now constructed, and does not require changes or alterations in the standard couplers provided for this class of service.

In Figs. 3 to 5 of the drawings, there is shown a modified form of system embodying this invention. In the drawings the system is shown in connection with a vehicle provided with a coupler 1a, which is of the type shown in Fig. 1 and is adapted to be coupled to a counterpart coupler 1a on another car. While this system is illustrated in connection with the type of coupler shown in Fig. 1 of the drawings, the system is not limited to the use of a coupler of this kind, but is adapted for use with other couplers of the same general type.

The coupler 1a is the same in construction and operation as the couplers shown in Fig. 1, except in certain particulars as will be hereinafter pointed out.

The coupler 1a has associated therewith a drum type switch 120 for controlling certain of the circuits which are established through contacts in the electric portion of the coupler 1a. The switch 120 may be of any suitable construction, and is provided with a shaft 121 having secured thereon movable contacts, not shown, adapted to engage at certain times stationary contacts, not shown, to establish circuits associated therewith.

The shaft 121 projects from the ends of the switch 120, and has one end secured to the plug valve in a valve 124 interposed in the pipe 125 leading from a reservoir 126 to a supply passage in the coupler 1a.

The other end of the shaft 121 projects from the other end of the body of the switch, and is secured to the plug valve 128 of a three way cock 130. The body of the cock 130 has a passage therein to which is connected the portion of the brake pipe 132 on the car, another passage therein to which is connected the portion of the brake pipe 132a leading to the coupler 1a, and still another passage to which is connected the branch pipe 134 leading to the brake valve 135 which is mounted on the end of the car on which the coupler 1a is carried.

The plug valve 128 of the cock 130 has ports therein which in one position of the plug valve establish communication between the two parts of the brake pipe, while in this position of the plug valve communication between the branch pipe 134 and the brake pipe 132 is cut off, as is clearly shown in Fig. 4 of the drawings.

The ports in the plug valve 128 are arranged so that in another position of the plug valve, communication is cut off between the portion of the brake pipe 132a which is connected to the coupler, and the portion of the brake pipe which is mounted on the car, while communication is established between the branch pipe 134 and the portion of the brake pipe 132 on the car, as is clearly shown in Fig. 5 of the drawings.

The shaft 121 has a gear 138 secured thereon which has teeth which mesh with the teeth in a rack 140 to which is secured pistons 141 and 142, which are reciprocable in the bore in a body 144 associated with the switch.

The bore in the body 144 has a port in the wall thereof which is connected by way of a pipe 146 with the chamber at the face of the slide retracting piston, not shown, in the electric portion of the coupler 1a, and thereby with the releasing mechanism of the coupler.

The coupler 1a differs from the coupler 1 in that the coupler 1a does not incorporate a communication through which fluid under pressure supplied to the chamber at the face of the slide retracting piston may flow to the chamber at the face of the slide retracting piston of a coupled coupler.

The equipment associated with the coupler 1a includes a coupling magnet valve device 148, and an uncoupling magnet valve device 150.

The coupling magnet valve device 148 comprises a body having therein a chamber 151 to which is connected a branch of the pipe 125 leading from the reservoir 126. A valve 152 is mounted in the chamber 151 and controls communication between the chamber 151 and a chamber 153, which is constantly connected by way of a pipe 154 with the chamber 155 at the face of the piston 142 in the body 144. A coil spring 157 is mounted in the chamber 151 and yieldingly presses the valve 152 to the seated position.

The body of the uncoupling magnet valve device 148 has another chamber 158 therein which is constantly open to atmosphere, while a valve 159 is mounted in this chamber and is adapted to engage a seat surrounding a passage open to the chamber 153 to control communication between the chamber 153 and the chamber 158. The valve 159 has a fluted stem which engages the end of the stem of the valve 152 to move the valve 152 against the spring 157.

The coupling magnet valve device 148 is provided with a winding, not shown, one terminal of which is connected by way of a wire 160 to a supply wire 161, while the other terminal of the winding of the magnet valve device is connected by way of the wire 162 with a stationary contact which is adapted to be engaged by a switch blade 164, which is connected to a supply wire 165. The supply wires 161 and 165 are supplied with electric current from a suitable source, not shown. When the switch blade 164 is turned to the switch closed position, the winding of the coupling magnet valve device 148 is energized and the valve 159 is moved to the seated position, while the valve 152 is moved away from its seat against the spring 157 to permit the supply of fluid under pressure from the chamber 151 to the chamber 153, and thence by way of the pipe 154 to the chamber 155 in the body 144 of the drum switch 120.

The uncoupling magnet valve device 150 is similar in construction to the coupling magnet valve device 148, and the body of this valve device has a chamber 167 therein which is constantly connected by way of a pipe 168 with the reservoir 126, while a valve 169 is mounted in this chamber and engages a seat surrounding a passage open to a chamber 170 which is constantly connected by way of a pipe 171 with the chamber 172 at the face of the piston 141 in the body 144 of the drum switch 120. A coil spring 173 is mounted in the chamber 167 and yieldingly presses the valve 169 to the seated position.

The body of the uncoupling magnet valve device 150 has a chamber 175 therein which is constantly connected to the atmosphere, while a valve 176 is mounted in this chamber to control communication between the chamber 170 and the chamber 175. The valve 176 has a fluted stem which engages the end of the stem of the valve 169 for moving the valve 169 against the spring 173. The uncoupling magnet valve device 150 has a winding, not shown, one terminal of which is connected by way of a wire 178 with the supply wire 161, while the other terminal of this winding is connected by way of a wire 179 with a stationary contact adapted to be engaged by switch blade 180, which is connected to the supply wire 165. When the switch blade 180 is turned to the closed position, the winding of the uncoupling magnet valve device 150 is energized and the valve 176 is moved to the seated position, while the valve 169 is moved against the spring 173 to the open position to thereby permit fluid under pressure supplied from the reservoir 126 through the pipe 168 to the chamber 167 to flow to the chamber 170, and thence by way of the pipe 171 to the chamber 172 at the face of the piston 141 of the drum switch 120.

The couplers 1a are arranged so that when two couplers are coupled together, circuits are established between the couplers with the result that on the supply of current to the winding of the coupling or uncoupling magnet valve device associated with either of the couplers, current will be supplied to the winding of the corresponding magnet valve device on the connected coupler.

As shown in the drawings the couplers 1a have brackets associated with the bodies thereof and carrying contacts which engage the contacts carried by the brackets on a coupled coupler. These contacts are arranged so they engage as soon as the couplers are brought together in the act of coupling, and so that they remain in engagement with each other until the couplers are separated in the act of uncoupling. These contacts are identified in the drawings by the reference numerals 160b, 162b, 178b and 179b.

The wire 160, which is connected to one terminal of the winding of the coupling magnet valve device 148, is connected by way of a wire 160a with the contact 160b on the coupler 1a on the car on which the uncoupling magnet valve device 148 is mounted.

The contact 160b on the connected coupler 1a is connected by way of a wire 160a with one terminal of the winding of the coupling magnet valve device 148 on the car on which this coupler is mounted, while the other contacts on this coupler are connected to apparatus on this car in the same manner as the contacts carried by the first-named coupler are connected to apparatus on the car on which that coupler is mounted.

The wire 162 leading to the other terminal of the winding of the coupling magnet valve 148 is connected by means of a wire 162a to the contact 162b carried by the coupler 1a, and when the switch 164 is closed, the winding of the coupling magnet valve 148 is energized, while current is supplied through the contacts 160b and 162b to energize the winding of the coupling magnet valve associated with the connected coupler.

Similarly, the wire 178 leading to one terminal of the winding of the uncoupling magnet valve device 150 is connected by way of a wire 178a with the contact 178b, while the wire 179 leading to the other terminal of the winding of the uncoupling magnet valve device 150 is connected by way of a wire 179a with the contact 179b, so that on the supply of current to the winding of the uncoupling magnet valve device 150, current will be supplied through the contacts 178b and 179b to the winding of the uncoupling magnet valve device associated with the connected coupler.

The equipment is shown in Fig. 3 of the drawings with the coupler 1a coupled to another coupler, and with the other apparatus in the positions which they assume when the coupler is coupled. At this time the switch blades 164 and 180 are in their open positions with the result that the windings of the coupling and uncoupling magnet valve devices are deenergized. As a result these magnet valve devices do not supply fluid under pressure to the chambers at the faces of the pistons 141 and 142, but connect these chambers to the atmosphere.

However, in the operation of coupling the coupler 1a to a counterpart coupler, it is essential to close the switch blade 164 for a time interval to cause the drum switch 120 to complete the circuits controlled thereby, and to operate the valves 124 and 130 to establish communication through the pipes which they control.

When the switch blade 164 is closed, the winding of the coupling magnet valve device 148 is energized, and the valve 159 is moved to the seated position to cut off communication between the chamber 155 and the atmosphere, while the valve 152 is moved to the open position against the spring 157 to permit fluid under pressure supplied from the reservoir 126 to the chamber 151 to flow to the chamber 153, and thence by way of the pipe 154 to the chamber 155. On an increase in the pressure of the fluid in the chamber 155, the pistons 142 and 141 are moved to the left, as viewed in Fig. 3 of the drawings, until these pistons have been moved to the position in which they are shown in Fig. 3 of the drawings. On movement of the pistons 141 and 142, the rack 140 turns the gear 138, thereby turning the shaft 121, and causing the movable contacts carried thereby to engage the stationary contacts associated therewith and complete the circuits which are controlled by the drum switch 120.

In addition, upon this movement of the shaft 121, the plug valve of the valve 124 is turned to a position in which it establishes communication through the supply pipe 125, while the plug valve 128 of the three way cock 130 is turned from the position in which it is shown in Fig. 5 of the drawings to the position in which it is shown in Fig. 4 of the drawings, in which position communication is established between the portions 132 and 132a of the brake pipe, while communication is cut off between the branch pipe 134 and the brake pipe.

After the switch blade 164 has been in the closed position for a brief time interval it is returned to the open position, thereby interrupting the circuit through the winding of the coupling magnet valve device 148, while the spring 157 thereupon moves the valve 152 to the seated position to cut off the supply of fluid under pressure to the chamber 155. On this movement of the valve 152, the valve 159 is moved to the open position to release fluid under pressure from the chamber 155. On this reduction in the pressure of the fluid in the chamber 155, the pistons 141 and 142 remain in the position to which they have been moved.

On the supply of current to the winding of the coupling magnet valve device 148, current is supplied through the contacts 160b and 162b, as explained above, to the winding of the coupling magnet valve device associated with the connected coupler, and effects operation of the equipment associated with this coupler in the manner described in detail above.

The equipment is shown in Fig. 3 of the drawings in the position which it assumes when the coupling of the end of the car to another car has been completed. At this time, the brake valve 135 will not be needed to control the brakes on the car, or on the train of which the car forms a part, while the brakes on this car, and on the other cars of the train, will be controlled by the brake valve at the end of a car which is not connected to another car.

It will be seen that at this time the three way cock 130 is operated to establish communication through the brake pipe, and to cut off communication between the brake pipe 132 and the branch pipe 134 leading to the brake valve 135. As a result, therefore, on a reduction in brake pipe pressure to effect an application of the brakes, fluid under pressure cannot flow from the relatively long branch pipe 134 to the brake pipe 132 and interfere with or delay the reduction in brake pipe pressure. Accordingly, the reduction in brake pipe pressure will be transmitted throughout the train very rapidly, and an application of the brakes can be effected very quickly.

The equipment provided by this invention is also arranged so that when the end of the car on which the coupler 1a is mounted is uncoupled from another car, the brake valve at this end of the car will be automatically connected to the brake pipe, to thereby permit the brakes on the car to be controlled by the brake valve on this end of the car.

In order to effect uncoupling of the coupler 1a from another coupler, the switch blade 180 is turned to the closed position, thereby energizing the winding of the uncoupling magnet valve device 150. Upon energization of the winding of this magnet valve device, the valve 176 is moved to the seated position to cut off communication between the chamber 172 at the face of the piston 141 and the atmosphere, while the valve 169 is moved against the spring 173 to the open position so that fluid under pressure supplied from the reservoir 126 to the chamber 167 may flow to the chamber 170, and thence by way of the pipe 171 to the chamber 172 at the face of the piston 141.

Upon an increase in the pressure of the fluid in the chamber 172 force is exerted upon the piston 141 to move this piston, the rack 140, and the piston 142 to the right, as viewed in Fig. 3 of the drawings. On this movement of the rack 140, the teeth in the rack engage the teeth in the gear 138 and turn the gear, thereby causing the shaft 121 to be turned, while the movable contacts carried by the shaft 121 are moved out of engagement with the stationary contacts associated therewith to thereby interrupt the circuits controlled by the drum switch 120.

On this movement of the shaft 121, the plug valve of the valve device 124 is turned to a position in which it cuts off communication through the supply pipe 125.

Similarly, on this movement of the shaft 121, the plug valve 128 of the three way cock 130 is turned from the position in which it is shown in Fig. 4 of the drawings, to the position in which it is shown in Fig. 5 of the drawings. On this movement of the plug valve 128, communication between the portions 132 and 132a of the brake pipe is cut off, while the port in the plug valve 128 connects the branch pipe 134 with the portion 132 of the brake pipe mounted on the vehicle. It will be seen, therefore, that in the act of uncoupling the coupler, the branch pipe 134 leading from the brake valve 135 is automatically connected to the brake pipe on the car so that the pressure of the fluid in the brake pipe may be regulated by operation of the brake valve 135 at the end of the car which is uncoupled.

When the piston 141 has been moved a predetermined distance in its range of movement, it opens communication between the chamber 172 and the port in the wall of the bore to which is connected the pipe 146, and fluid under pressure supplied to the chamber 172 will flow to the pipe 146, and to the chamber at the face of the slide retracting piston, not shown, of the electric portion of the coupler, and thence to the chamber at the face of the piston in the releasing mechanism of the coupler so as to release the coupler.

The coupler 1a differs from the coupler 1 shown in Fig. 1 in that fluid under pressure supplied through the pipe 146 to the chamber at the face of the slide retracting piston flows therefrom to the chamber at the face of the releasing piston, instead of to the chamber at the face of an operating piston for operating a valve to supply fluid under pressure from the supply pipe to the chamber at the face of the releasing piston.

After the switch 180 has been in the closed position for a brief time interval, it is turned to the open position thereby interrupting the circuit through the winding of the uncoupling magnet valve device 150, whereupon the valve 169 is moved by the spring 173 to the seated position to cut off the supply of fluid under pressure to the chamber 172, while the valve 176 is moved to the open position to release fluid under pressure from the chamber 172. On this reduction in the pressure of the fluid in the chamber 172, the pistons 141 and 142 remain in the position to which they have been moved, while fluid under pressure will also be released from the chamber at the face of the slide retracting piston in the coupler, and from the chamber at the face of the piston in the releasing mechanism of the coupler. However, it is contemplated that the switch 180 will be held in the closed position for a time interval long enough for the contact carrying slide in the coupler to be retracted, and for the releasing mechanism in the coupler to be operated to release the coupler.

On the supply of current to the winding of the uncoupling magnet valve device 150, current is supplied through the contacts 178b and 179b, as explained above, to the winding of the uncoupling magnet valve device associated with the connected coupler, and effects operation of the equipment associated with this coupler in the manner described in detail above.

The drum switch 120 associated with each of the couplers, therefore, will be operated to interrupt the circuits controlled thereby, and will also be operated to cut off communication through the supply pipe leading to the couplers, and, in addition, to cut off communication from the portion of the brake pipe on the car to the portion of the brake pipe connected to the coupler, and to connect the branch pipe at the end of the car to the brake pipe on the car.

After the cars are separated, the brakes on either car may be controlled in the usual manner by operation of the brake valve 135 on that car.

If it is desired to couple the cars together they are brought together in the usual manner and the mechanism in the couplers operates to connect the cars together. It is necessary thereafter, however, to move the switch blade 164 on one of the cars to the closed position to thereby energize the windings of the coupling magnet valve devices 148. Upon energization of these windings, fluid under pressure is supplied to the chambers 155 at the faces of the pistons 142, and moves these pistons and the racks 140 so that the gears 138 are turned, thereby turning the shafts 121 with the result that the movable contacts carried by these shafts engage the stationary contacts associated therewith to complete the circuits through the contacts in the electric portions of the couplers 1a.

On this movement of the shafts 121, the plug valves of the valve devices 124 are turned to the positions in which communication is established through the supply pipes 125 with the result that fluid under pressure may flow from the reservoirs 126 through the pipes 125 to the passages in the couplers 1a, and on the supply of fluid under pressure to the passages in the couplers, fluid may flow therefrom to the chambers at the faces of the trigger release pistons, as explained in detail in connection with the couplers shown in Fig. 1, so that these pistons will release the triggers associated with the contact carrying slides in the electric portions of the couplers, and permit these slides to be projected outwardly by the springs associated therewith.

In addition, upon this movement of the shafts 121, the plug valves 128 of the three way cocks 130 are turned from the position in which they are shown in Fig. 5 of the drawings to the position in which they are shown in Fig. 4 of the drawings, in which position communication is cut off between the branch pipes 134 and the brake pipes, and in which communication is established between the two portions of the brake pipes.

It will be seen, therefore, that when the coupler at an end of the vehicle is coupled to another coupler, the equipment operates automatically to cut off communication between the brake pipe and the branch pipe leading from the brake valve at this end of the vehicle, and that communication is established through the brake pipe to permit brake pipe pressure to be transmitted throughout the entire train.

After the switch 164 has been in the closed position for the brief time interval it is returned to the open position, and the coupling magnet valve devices 148 are operated to cut off the supply of fluid under pressure to the chambers 155, and to release fluid under pressure therefrom.

In Fig. 6 there is shown a brake equipment incorporating a modified form of apparatus provided by this invention. This equipment is similar to that shown in Figs. 3 to 5 of the drawings, but differs therefrom as it employs a diaphragm type valve instead of a three way cock for controlling communication between the brake pipe and the branch pipe, and as it incorporates manually controlled means to connect the branch pipe with the brake pipe, if desired, at a time when the end of the car is coupled to another car.

The equipment shown in Fig. 6 is the same as that shown in Figs. 3 to 5 of the drawings, except as hereinafter pointed out in detail, and the same reference numerals are employed to identify the portions of the apparatus shown in Fig. 6 which are also employed in the equipment shown in Figs. 3 to 5.

The equipment shown in Fig. 6 includes couplers 1b, which are similar to those employed in the equipment shown in Fig. 3 in that fluid supplied to the chambers at the faces of the slide retracting pistons therein flows to the chambers at the faces of the pistons of the coupler release mechanism, but does not flow to the mechanism in a connected coupler.

The couplers 1b also differ from the couplers shown in Figs. 1 and 3 in that they do not incorporate valve means 55 to control communication between the brake pipe and the ports at the faces of the couplers. The brake pipe passages in the couplers 1b are carried to the faces of the couplers, and are surrounded by resilient bushings similar to those shown in Fig. 1 of the drawings which engage when two couplers are coupled together to establish connection between the brake pipe passages in the couplers and to prevent leakage of fluid under pressure from the brake pipe passages.

The equipment shown in Fig. 6 of the drawings further differs from that shown in Fig. 3 of the drawings in that in place of the three way cocks 130 employed in the equipment shown in Fig. 3 to control communication between the branch pipe and the brake pipe and to also control communication through the brake pipe, a valve 130a is employed which serves only to control communication through the brake pipe.

In the equipment shown in Fig. 6 of the drawings, the branch pipe 134a leading from the brake valve device 135 communicates with the brake pipe portion 132 on the car, while this branch pipe has interposed therein at a point adjacent the brake pipe, a control valve device 93a which is similar to the control valve device 93 employed in the equipment shown in Fig. 1 of the drawings.

The operating chamber of the control valve device 93a, which corresponds to the chamber 108 of the control valve shown in Fig. 2, is connected by way of a pipe 185 with a port in the body of a manually operated three way valve device 186 which controls communication between the pipe 185 and a pipe 187, leading from the portion 132a of the brake pipe between the valve 130a and the coupler 1b, and which also controls communication between the pipe 185 and an atmospheric port 189.

The valve device 186 includes a plug valve 190 which is turned between spaced positions by means of a handle 192, while the plug valve 190 has therein an angular port 193 which in one position of the plug valve 190 connects the pipe 185 to the pipe 187, and which in another position of the plug valve 190 connects the pipe 185 to the atmospheric port 189.

The equipment is shown in Fig. 6 of the drawings in the condition which it assumes when the coupler at the end of the car is coupled to another coupler. At this time the drum switch 120 is conditioned to maintain the circuits controlled thereby, while the shaft 121 of the drum switch 120 holds the plug valves of the valve devices 124 and 130a in positions in which communication is established through the supply pipe 125 and through the brake pipe with the result that fluid under pressure is supplied to the portions of these pipes which are connected to the coupler 1b, while the passages in the couplers are in communication with each other.

At this time the chambers in the body 144 associated with the drum switch 120 are connected to the atmosphere by the magnet valve devices associated therewith, while the switches 164 and 180 are open.

At this time the brake valve device 135 is not normally required to control the brakes on the car on which the brake equipment is mounted, or to control the brakes on the train of which the car forms a part. Accordingly the handle 192 and the plug valve 190 of the valve device 186 are left in the position in which they are shown in Fig. 6 of the drawings, in which the port 193 establishes communication between the pipe 187 leading from the brake pipe portion 132a, and the pipe 185 leading to the operating chamber in the control valve device 93a, while in this position of the plug valve 190 communication between the pipe 185 and the atmospheric port 189 is cut off. As a result of the supply of fluid under pressure through the pipe 185 to the operating chamber of the control valve device 93a, this valve device is operated as described in detail in connection with the system shown in Figs. 1 and 2 to cut off communication between the brake pipe portion 132 and the branch pipe 134a leading to the brake valve device 135 and to maintain this communication cut off.

Accordingly, if at this time there is a reduction in brake pipe pressure to effect an application of the brakes, fluid under pressure cannot flow from the branch pipe 134a to the brake pipe where it would tend to maintain the pressure of the fluid in the brake pipe and to create a turbulence in the brake pipe which would interfere with the transmission of a reduction in brake pipe pressure throughout the train, and thereby delay the application of the brakes on the cars at the rear of the train.

While the brake valve device at the end of a car is not normally required to control the brakes on the car at the time when the end of the car is coupled to another coupler, the brake valve device may be required for this purpose at certain times, as when cars are being coupled and uncoupled. Accordingly, the system shown in Fig. 6 of the drawings is arranged so that communication may be established between the brake pipe and the branch pipe leading to the brake valve device at an end of the car at a time when the end of the car is coupled to another car.

If it is desired to establish communication between the brake pipe and the branch pipe at the end of a car connected to another car, the handle 192 of the valve device 186 is turned from the position in which it is shown in Fig. 2 of the drawings to the position indicated by broken lines, thereby turning the plug valve 190 to a position in which it cuts off communication between the pipe 187 leading from the brake pipe portion 132a, and the pipe 185, and in which the angular passage 193 in the plug valve establishes communication between the pipe 185 and the atmospheric port 189.

On movement of the plug valve 190 to this position fluid under pressure is released of the operating chamber of the control valve device 93a and the higher pressure of the fluid in the brake pipe portion 132 causes the diaphragm of this valve device to be moved away from the seating face incorporated therein to thereby establish communication between the branch pipe 134a and the brake pipe portion 132 in order that a reduction in brake pipe pressure to apply the brakes may be effected by operation of the brake valve device 135 if desired, and also so that the brake pipe pressure may be increased by operation of the brake valve device 135 to release the brakes if desired.

When it is desired to restore the equipment to the normal condition in which the control valve device 93a cuts off or establishes communication between the brake pipe and the branch pipe in accordance with whether or not the end of the car is coupled to another, the handle 192 is returned to the position indicated by full lines in Fig. 6 of the drawings, thereby returning the plug valve 190 to the position in which the angular port 193 establishes communication between the pipe 187 and the pipe 185 so that fluid under pressure may flow from the brake pipe portion 132a to the operating chamber of the control valve device 93a.

When an end of a car is not coupled to another car the brake valve device at that end of the car may be required to control the brakes on the car or on a train of which the car forms a part, and the equipment shown in Fig. 6 of the drawings is arranged so that when the end of a car is not coupled to another, the control valve device 93a will maintain communication between the brake pipe and the branch pipe leading to the brake valve device at that end of the car, and so that it cannot be conditioned to cut off communication between the brake pipe and the branch pipe as long as the end of the car remains uncoupled from another car.

This prevents accidents or collisions which might occur if the control valve device 93a cut off communication between the brake pipe and the branch pipe leading to the brake valve device at the end of a car which was not coupled to another car, thereby making it impossible to produce a reduction in brake pipe pressure to effect a brake application by operation of the brake valve device at this end of the car.

When it is desired to uncouple the end of a car from another car, the switch 180 is closed, thereby energizing the winding of the uncoupling magnet valve device 150 which is thereupon operated to supply fluid under pressure to a chamber in the body 144 associated with the drum switch 120 to effect operation of this switch to interrupt the circuits controlled thereby, while the shaft 121 of the drum switch 120 turns the plug valves of the valve devices 124 and 130a to the positions to cut off communication through the supply pipe 125 and through the brake pipe.

In addition, fluid under pressure supplied by operation of the uncoupling magnet valve device 150 flows by way of the pipe 146 to the slide retracting piston in the coupler 1b, as explained above, and thence to the releasing mechanism in the coupler, while current supplied through the wires 178a and 179a flows to the mechanism on the connected car and effects similar operation of the mechanism on that car.

As soon as the couplers are released, the cars may be parted and the fluid under pressure present in the portion 132a of the brake pipe connecting the valve device 130a with the coupler 1b is released to the atmosphere. On the release of fluid under pressure from the pipe 132a, fluid flows from the pipe 187 to the pipe 132a and thence to the atmosphere. If at this time the handle 192 is in the position indicated by solid lines in Fig. 6 of the drawings, in which the plug valve 190 is in a position in which the angular port 193 therein establishes communication between the pipes 185 and 187, fluid under pressure will flow from the operating chamber of the control valve device 93a through the pipe 185 to the pipe 187, and thence to the brake pipe portion 132a and to the atmosphere.

On this reduction in the pressure of the fluid in the operating chamber of the control valve device 93a, the higher pressure of the fluid in the brake pipe portion 132 moves the diaphragm of the control valve device 93a away from the seating face therein to thereby establish communication between the brake pipe portion 132 and the branch pipe 134a leading from the brake valve device 135. Accordingly, the brake valve device 135 is connected with the brake pipe, and a reduction in brake pipe pressure to effect a service application of the brakes or an increase in brake pipe pressure to effect the release of the brakes may be effected by operation of the brake valve device 135 if desired.

It will be seen, therefore, that as soon as the end of the car is uncoupled from another car, the control valve device 93a will be automatically conditioned to establish communication between the brake pipe and the branch pipe leading to the brake valve device at that end of the car, even though the plug valve of the valve device 186 is in the position to normally condition the control valve device 93a to cut off communication between the brake pipe and the branch pipe. As long as the end of the car is not coupled to another car, the brake pipe portion 132a is open to the atmosphere through the coupler 1b, and the control valve device 93a will be conditioned to establish communication between the brake pipe portion 132 and the branch pipe 134a, and cannot be conditioned to cut off communication between these pipes.

When the end of the car is coupled to another car the cock 130a is operated to establish communication between the brake pipe portions 132 and 132a so that fluid under pressure is again supplied to the brake pipe portion 132a, as explained in detail in connection with the description of the species shown in Fig. 3 of the drawings, and fluid under pressure will flow by way of the pipes 187 and 185 to the operating chamber of the control valve device 93a to again condition this valve device to cut off communication between the brake pipe and the branch pipe 134a, unless the valve device 186 has been operated to cut off communication between the pipes 187 and 185.

It will be seen that the form of equipment shown in Fig. 6 of the drawings includes a control valve device which operates automatically to cut off or establish communication between the brake pipe and the branch pipe leading to the brake valve device at the end of a car in accordance with whether or not this end of the car is coupled to another car.

It will be seen also that this control valve device cannot be conditioned to cut off communication between the brake pipe and the branch pipe at a time when the end of the car is not coupled to another car, but that manually controlled means is provided to enable the control valve device to be conditioned to establish communication between the brake pipe and the branch pipe, if desired, at a time when the end of a car is coupled to another car. This permits the brakes on the car or on a train of which the car forms a part to be operated by means of the brake valve device on the car before the end of the car is uncoupled from another car or after the end of the car is coupled to another car. This is desirable as it enables the car to be controlled during the coupling and uncoupling operations.

In the system shown in Fig. 6 of the drawings the pipe 187 through which fluid under pressure is supplied to the control valve device 93a is connected to the brake pipe portion 132a It is contemplated, however, that instead the pipe 187 may be connected to the supply pipe 125 at a point therein between the valve device 124 and the coupler. This portion of the supply pipe 125 is charged with fluid under pressure when the coupler is coupled to another, and is vented to the atmosphere when the coupler is not coupled to another in the same manner as the brake pipe portion 132a is charged with fluid under pressure or is vented to the atmosphere so that the operation of the equipment is the same as when the pipe 187 is connected to the brake pipe portion 132a as shown in Fig. 6.

It will be seen that the equipment provided by this invention incorporates means which are arranged so that when the coupler at an end of the car is coupled to another coupler, the branch pipe leading to the brake valve at this end of the car is automatically isolated from the brake pipe on the car. Accordingly, on a reduction in brake pipe pressure, fluid under pressure cannot flow from the branch pipe to the brake pipe, and interfere with the propagation of reduction in brake pipe pressure throughout the train.

When an end of a car is coupled to another car, the brake valve at this end of the car is not required to control the brakes on the car. However, when an end of a car is not coupled to another car, the brake valve at this end of the car may be required to control the brakes on the car. Accordingly, the equipment provided by this invention is arranged so that when the coupler at an end of a car is uncoupled from another coupler, the branch pipe leading to the brake valve at this end of the car will be automatically connected to the brake pipe to thereby restore control of brake pipe pressure to the brake valve, and permit the brakes on the car to be operated by means of this brake valve.

It will be seen that the connection of the branch pipe to the brake pipe, or the disconnecting of the branch pipe from the brake pipe, takes place automatically as a part of the work of coupling and uncoupling of the car, and does not necessitate special attention on the part of a trainman. Accordingly, there is no possibility that the end of a car will be uncoupled from another car without restoring control of brake pipe pressure to the brake valve on the car which is uncoupled.

While the invention has been illustrated and described in connection with one type of combined car, electric, and air coupler, it is to be understood that the invention is not limited to the employment of this kind of a coupler, but that the use of different couplers of this general type is contemplated, and that numerous changes and modifications may be made in the system without departing from the scope of the following claims.

Having now described my invention, what I claim as new and desire to secure by Letters Patent, is:

1. In a fluid pressure brake equipment on a vehicle provided with a vehicle coupler adapted to couple with a counterpart coupler, the brake equipment comprising a brake pipe, a brake valve device, and a branch pipe connecting the brake valve device with the brake pipe, valve means controlling communication from the brake pipe to the branch pipe, and means operative upon uncoupling the vehicle coupler from a counterpart coupler for effecting the operation of said valve means to open communication between the brake pipe and the branch pipe.

2. In a fluid pressure brake equipment on a vehicle provided with a vehicle coupler adapted to couple with a counterpart coupler, the brake equipment comprising a brake pipe, a brake valve device, and a branch pipe connecting the brake valve device with the brake pipe, valve means controlling communication from the brake pipe to the branch pipe, and means operative upon uncoupling the vehicle coupler from a counterpart coupler for effecting the operation of said valve means to open communication between the brake pipe and the branch pipe, and upon coupling the vehicle coupler to a counterpart coupler for effecting the operation of said valve means to close communication between the brake pipe and the branch pipe.

3. In a fluid pressure brake equipment on a vehicle provided with a vehicle coupler adapted to couple with a counterpart coupler, the brake equipment comprising a brake pipe, a brake valve device, and a branch pipe connecting the brake valve device with the brake pipe, valve means controlling communication from the brake pipe to the branch pipe, and means operative upon coupling the vehicle coupler to a counterpart coupler for effecting the operation of said valve means to close communication between the brake pipe and the branch pipe.

4. In a fluid pressure brake equipment on a vehicle provided with a vehicle coupler adapted to couple with a counterpart coupler, the brake equipment comprising a brake pipe, a brake valve device, and a branch pipe connecting the brake valve device with the brake pipe, valve means operative upon an increase in fluid pressure for closing communication between the brake pipe and the branch pipe, and means for supplying fluid under pressure to said valve means upon coupling the vehicle coupler to a counterpart coupler.

5. In a fluid pressure brake equipment for a vehicle having a brake pipe and carrying a coupler adapted when coupled to a counterpart coupler to establish communication between a brake pipe on said vehicle and the brake pipe on the connected car, the coupler having associated therewith an uncoupling device operative to release the coupler, the brake equipment comprising a brake valve, a branch pipe connecting said brake valve with the brake pipe, a valve device controlling communication between the brake pipe and the branch pipe, and means controlled by the uncoupling device for operating said valve device.

6. In a fluid pressure brake equipment for a vehicle having a coupler adapted to be coupled to a counterpart coupler, the coupler having uncoupling means associated therewith for releasing the coupler, the brake equipment comprising a brake pipe, a brake valve, a branch pipe connecting the brake valve with the brake pipe, and a valve device controlled by said uncoupling means for controlling communication between said brake pipe and said branch pipe.

7. In a fluid pressure brake equipment for a vehicle having a coupler adapted to be coupled to a counterpart coupler, the brake equipment comprising a brake pipe, a brake valve, a branch pipe connecting the brake valve with the brake pipe, a valve device controlling communication between said brake pipe and said branch pipe, and means operated in accordance with whether the coupler is connected to another coupler or not for operating said valve device.

8. In a fluid pressure brake equipment for a vehicle having a coupler adapted to be coupled to a counterpart coupler, said coupler having associated therewith means responsive to the pressure of the fluid supplied thereto for effecting the release of said coupler, the brake equipment comprising a brake pipe, a brake valve, a branch pipe connecting the brake valve with the brake pipe, a valve device controlling communication between the brake pipe and said branch pipe, and means operated in accordance with variations in the pressure of the fluid supplied to said releasing means for controlling said valve device.

9. In a fluid pressure brake equipment for a vehicle having a coupler adapted to be connected to a counterpart coupler, said coupler having associated therewith means operative on the supply of fluid under pressure to effect a release of the coupler, the brake equipment comprising a brake pipe, a brake valve, a branch pipe connecting the brake valve with the brake pipe, and valve means operated on the supply of fluid to said releasing means to establish communication between the brake pipe and the branch pipe.

10. In a fluid pressure brake equipment for a car having a coupler provided with an electric portion adapted to establish circuits between the car and the coupled car, said electric portion having associated therewith fluid pressure operated switch means for controlling said circuits, the brake equipment comprising a brake pipe, a brake valve, a branch pipe connecting said brake valve and said brake pipe, and valve means responsive to the pressure of the fluid supplied to said fluid pressure operated switch means for controlling communication between the brake pipe and the branch pipe.

11. In a fluid pressure brake equipment for a car provided with a coupler having an electric portion adapted to establish circuits between the car and a coupled car, said electric portion having associated therewith fluid pressure operated control means, the coupler also having associated therewith fluid pressure operated releasing means, and a valve device controlling the supply of fluid under pressure to said control means and to said releasing means, the brake equipment comprising a brake pipe, a brake valve, a branch pipe connecting the brake pipe with the brake valve, and valve means controlled by said valve device and controlling communication between the brake pipe and the branch pipe.

12. In a fluid pressure brake equipment for a vehicle, in combination, a brake pipe on the vehicle, a brake valve, a branch pipe connecting the brake valve with the brake pipe, a communication on said vehicle which is supplied with fluid under pressure only when the vehicle is connected to another vehicle, and a valve device responsive to the pressure of the fluid in said communication for controlling communication between the brake pipe and said branch pipe.

13. In a fluid pressure brake equipment for a vehicle provided with a car, air and electric coupler of the type incorporated releasing mechanism operative on the supply of fluid under pressure thereto to release the coupler, and having associated therewith a control device for effecting the supply of fluid under pressure to said releasing means, the brake equipment comprising a brake pipe, a brake valve, a branch pipe connecting the brake valve and the brake pipe, and valve means controlled by said control device and controlling communication between said branch pipe and the brake pipe.

14. In a fluid pressure brake equipment for a vehicle provided with a car, air and electric coupler of the type incorporated releasing mechanism operative on the supply of fluid under pressure thereto to release the coupler, and having associated therewith a control device for effecting the supply of fluid under pressure to said releasing means, the brake equipment comprising a brake pipe, a brake valve, a branch pipe connecting the brake valve and the brake pipe, valve means operative on the supply of fluid under pressure to establish communication between the branch pipe and the brake pipe, and means for supplying fluid under pressure to said valve means on operation of said control device to supply fluid under pressure to said releasing means.

15. In a fluid pressure brake equipment for a vehicle provided with a coupler of the type having an electric portion incorporating a contact carrying slide which when the coupler is coupled to another is projected outwardly by a spring, the coupler having a trigger for preventing movement of said slide by said spring and having means operative on the supply of fluid under pressure to a chamber to release said trigger, said coupler also incorporating means operative only when the coupler is coupled to another to supply fluid under pressure to said chamber, the brake equipment comprising a brake pipe, a brake valve, a branch pipe connecting the brake valve with the brake pipe, and means responsive to the pressure of the fluid in the chamber in said coupler for controlling communication between the brake pipe and said branch pipe.

16. In a fluid pressure brake equipment for a vehicle provided with a coupler of the type having an electric portion incorporating a contact carrying slide which when the coupler is coupled to another is projected outwardly by a spring, the coupler having a trigger for preventing movement of said slide by said spring and having means operative on the supply of fluid under pressure to a chamber to release said trigger, said coupler also incorporating means operative only when the coupler is coupled to another to supply fluid under pressure to said chamber, the brake equipment comprising a brake pipe, a brake valve, a branch pipe connecting the brake valve with the brake pipe, valve means operative on an increase in fluid pressure to cut off communication between the brake pipe and said valve means, and means for supplying fluid under pressure to said valve means from said chamber.

17. In a vehicle fluid pressure brake equipment, in combination, a brake valve mounted on said vehicle adjacent an end thereof, a brake pipe on the vehicle and having a portion at said vehicle end which is supplied with fluid under pressure only when the end of the vehicle is connected to another, means subject to and operated on a reduction in brake pipe pressure to effect an application of the brakes, a branch pipe connecting the brake valve with the brake pipe, valve means subject to and operated on an increase in fluid pressure to cut off communication between the brake pipe and the branch pipe, and means for supplying fluid under pressure from said brake pipe portion to said valve means.

18. In a vehicle fluid pressure brake equipment, in combination, a brake valve mounted on said vehicle adjacent an end thereof, a brake pipe on the vehicle and having a portion at said vehicle end which is supplied with fluid under pressure only when the end of the vehicle is connected to another, means subject to and operated on a reduction in brake pipe pressure to effect an application of the brakes, a branch pipe connecting the brake valve with the brake pipe, valve means subject to and operated on an increase in fluid pressure to cut off communication between the brake pipe and the branch pipe, and manually controlled means for supplying fluid under pressure from said brake pipe portion to said valve means and for releasing fluid from said valve means.

19. In a fluid pressure brake equipment for a vehicle having a communication thereon which is supplied with fluid under pressure when and only when an end of the vehicle is coupled to another vehicle, the brake equipment comprising a brake pipe on the vehicle, a brake valve at said vehicle end, a branch pipe connecting said brake valve with the brake pipe, valve means operative on an increase in fluid pressure to cut off communication between the brake pipe and the branch pipe, and manually controlled means for supplying fluid from said communication to said valve means.

20. In a fluid pressure brake equipment for a vehicle having a communication thereon which is supplied with fluid under pressure when and only when an end of the vehicle is coupled to another vehicle, the brake equipment comprising a brake pipe on the vehicle, a brake valve at said vehicle end, a branch pipe connecting said brake valve with the brake pipe, valve means operative on an increase in fluid pressure to cut off communication between the brake pipe and the branch pipe, and manually controlled means for supplying fluid from said communication to said valve means, said manually controlled means being also operative to cut off the supply of fluid from said communication to said valve means and to release fluid from said valve means.

JOHN B. HULL.